United States Patent [19]

Udagawa

[11] Patent Number: 4,791,897
[45] Date of Patent: Dec. 20, 1988

[54] STEEL LAMINATE TYPE CYLINDER HEAD GASKET

[75] Inventor: Tsunekazu Udagawa, Ichikawa, Japan

[73] Assignee: Ishikawa Gasket Co., Ltd., Tokyo, Japan

[21] Appl. No.: 69,668

[22] Filed: Jul. 6, 1987

[30] Foreign Application Priority Data

Apr. 21, 1987 [JP] Japan .............................. 62-60439[U]

[51] Int. Cl.⁴ .............................................. F02F 11/00
[52] U.S. Cl. ........................ 123/193 CH; 277/235 R
[58] Field of Search ............ 123/193 CH, 41.74, 273; 277/235 B, 207 R, 213

[56] References Cited

U.S. PATENT DOCUMENTS

| 2,130,110 | 9/1938 | Victor et al. | 277/232 |
| 3,430,611 | 3/1969 | Belter | 277/235 B |
| 3,433,490 | 3/1969 | Teucher et al. | 277/235 B |

FOREIGN PATENT DOCUMENTS 0090745  5/1984  Japan .............................. 277/235 B Primary Examiner—Willis R. Wolfe
Assistant Examiner—M. Macy
Attorney, Agent, or Firm—Frank J. Jordan; C. Bruce Hamburg; Manabu Kanesaka

[57] ABSTRACT

A steel laminate type cylinder head gasket of the invention is installed in an engine having a cylinder block with a cylinder bore, a cylinder head with an auxiliary combustion chamber, and a mouth plate attached to the cylinder head for defining the auxiliary combustion chamber. The gasket comprises a first plate, and at least one second plate situated adjacent to the first plate. The first plate includes at least one curved first bead having a contour corresponding to a part of the mouth plate, and at least one second bead, the second bead intercrossing an outer end of the first bead and extending at least partly along the cylinder bore. The first plate further includes at least two third beads, each extending between the first and second beads so that the outer end of the first bead is located close to the cylinder bore relative to the third bead.

8 Claims, 3 Drawing Sheets

STEEL LAMINATE TYPE CYLINDER HEAD GASKET

BACKGROUND OF THE INVENTION AND RELATED ART STATEMENT

The present invention relates to a steel laminate type cylinder head gasket for an internal combustion engine with an auxiliary combustion chamber.

An engine with an auxiliary combustion chamber is known, which comprises, as shown in FIG. 1, a cylinder block J having at least one cylinder bore Hc, a cylinder head H having a depression K, and a mouth plate L attached to the cylinder head H to cover the depression K for constituting an auxiliary combustion chamber M. A gasket 10 is installed between the cylinder head H and the cylinder block J. As a result, the gasket 10 supports a part N of the mouth plate L (FIG. 2). Namely, the part N of the mouth plate L is located on and supported by the gasket 10.

When the mouth plate L is installed in the cylinder head H, a lower surface of the cylinder head H must be precisely flush with a lower surface of the mouth plate L. Otherwise, sealing around the cylinder bore Hc of the cylinder block J can not be securely made.

Actually, it is very difficult to prepare the cylinder head H and the mouth plate L so that the lower surfaces thereof are flush with each other. Generally, the lower surface of the mouth plate L slightly projects or dents from the lower surface of the cylinder head H. Moreover, even if the lower surfaces of the cylinder head H and the mouth plate L are flush with each other when the mouth plate L is installed in the cylinder head H, in case the engine is operated, the lower surfaces of the cylinder head H and the mouth plate L do not become flush with each other due to heat of the engine.

Under the circumstances, unless a gasket situated between the cylinder head H and the cylinder block J can provide sufficient elasticity in any situation, sealing around the cylinder head H, cylinder block J and mouth plate L can not be properly made. However, since a conventional steel laminate gasket 10 as shown in FIG. 1 is formed of a plurality of steel plates and a wire ring, the steel laminate gasket 10 can not provide sufficient elasticity to properly seal around the cylinder bore. Therefore, it was desired to provide a steel laminate gasket which can securely seal around the cylinder bore.

In view of the drawbacks of the conventional steel laminate gasket, an improved steel laminate gasket is proposed in Japanese patent application No. 57-199777 (published on May 25, 1984 as Publication No. 59-90745), wherein one of plates forming a steel laminate gasket is provided with a plurality of projections or beads at an area P' corresponding to the part N of the mouth plate L. As shown in FIG. 3, beads 11 are concentrically arranged at the part P' of a plate 12.

The steel laminate gasket with the beads 11 as disclosed in Publication No. 59-90745 can properly seal around the cylinder bore Hc, as compared with a steel laminate gasket without beads. However, the steel laminate gasket with the beads 11 can not perfectly seal.

As a result of study, it was noticed that when the engine with the auxiliary combustion chamber is operated, the mouth plate L may move toward the auxiliary combustion chamber. In particular, the center of the mouth plate L dents deepest, and the dent becomes shallower as it goes toward the edge of the mouth plate L. This is because the mouth plate L separating the combustion chamber from the auxiliary combustion chamber is severely affected by heat and pressure changes of the combustion chamber. The steel laminate gasket with the beads 11 as disclosed in Publication No. 59-90745 could not properly absorb the movement of the mouth plate L caused by the heat and pressure changes of the combustion chamber. Namely, the gasket with the beads 11 can seal a shallow portion of a dent but can not seal a deep portion thereof. Consequently, gas leakage may happen.

Further, when high temperature and pressure are applied to the mouth plate, the mouth plate may deform. The conventional gasket can not seal around mouth plate when the mouth plate L is deformed. Gas leakage happens especially at portions where the outer periphery of the mouth plate L intersects the outer periphery of the cylinder bore Hc.

Accordingly, one object of the present invention is to provide a steel laminate gasket for an engine with an auxiliary combustion chamber, which can seal properly around the entire cylinder bore.

Another object of the present invention is to provide a steel laminate gasket as stated above, wherein different sealing pressure applied to the gasket can be properly absorbed.

A further object of the present invention is to provide a steel laminate gasket as stated above, wherein even if the mouth plate is deformed, a seal around the mouth plate can be properly made.

A still further object of the present invention is to provide a steel laminate gasket as stated above, wherein the gasket can be easily and economically manufactured.

Further objects and advantages of the invention will be apparent from the following description of the invention.

SUMMARY OF THE INVENTION

In accordance with the present invention, a steel laminate type cylinder head gasket is installed in an engine having a cylinder block with a cylinder bore, a cylinder head with an auxiliary combustion chamber and a mouth plate attached to the cylinder head for defining the auxiliary combustion chamber. The gasket includes at least one first sealing area around the cylinder bore and at least one second sealing area adjacent the first sealing area, on which the mouth plate is mounted. The second sealing area is defined by a curved outer line corresponding to a part of a contour of the mouth plate and an inner line corresponding to a part of a contour of the cylinder bore.

The gasket comprises a first plate and at least one second plate situated adjacent to the first plate to form the steel laminate gasket. The first plate is provided with at least one curved first bead situated outside the second sealing area and adjacent to the curved outer line, and at least one second bead. The second bead intercrosses an outer end of the first bead and extends at least partly along the cylinder bore at the first sealing area. The first plate is further provided with at least two third beads, each third bead extending between the first and second beads so that the outer end of the first bead is located close to the cylinder bore relative to the third bead. The third bead can seal portions where the leakage is likely to happen, i.e. the portion that the outer periphery of the mouth plate L intersects the outer periphery of the cylinder bore Hc.

The first plate may further include a curved fourth bead situated in the second sealing area and adjacent to the curved outer line, and a curved fifth bead extending along and adjacent to the cylinder bore in the second sealing area. The fifth bead intercrosses outer ends of the fourth bead adjacent the cylinder bore and extends to the second beads to intercross thereto.

The first plate may further include at least one sixth bead located in the second sealing area and at a predetermined distance away from the fifth bead. The sixth bead includes outer ends which intercross the fourth bead.

Also, the first plate may be provided with at least one notch at a portion corresponding to the second sealing area. In this case, the gasket additionally includes a sealing material situated in the notch of the first plate. The second sealing area is sealed by the sealing material.

DETAILED DESCRIPTION OF PREFERRED EMBODIMENTS

Figure 1:
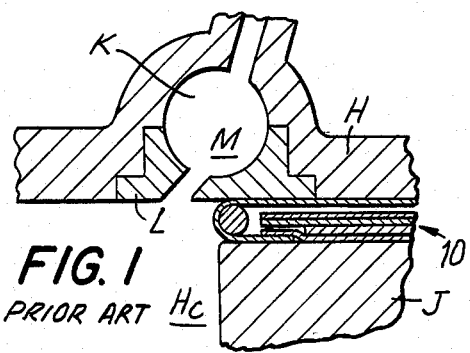
FIG. 1 is an explanatory section view of a conventional gasket installed in an engine with an auxiliary combustion chamber.
Figure 2:
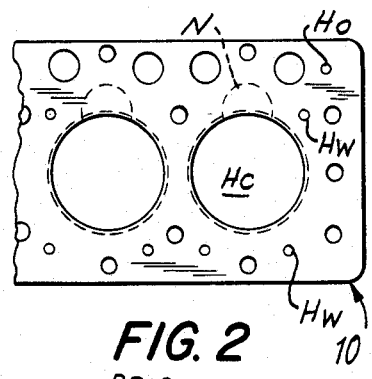
FIG. 2 is a plan view of a part of the conventional gasket.
Figure 4:
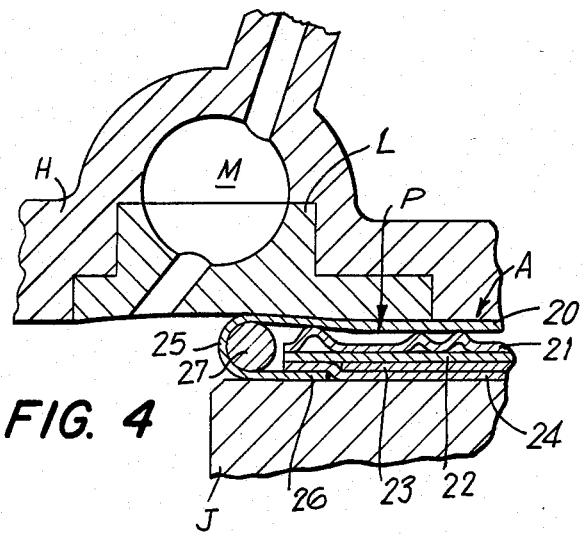
FIG. 4 is an explanatory section view of a first embodiment of a gasket of the present invention installed in an engine with an auxiliary combustion chamber.
Figure 3:
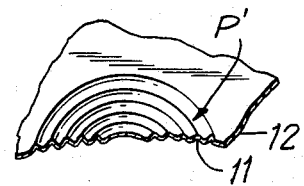
FIG. 3 is an explanatory perspective view of a part of a conventional steel plate.

Referring to FIG. 4, a first embodiment A of a steel laminate gasket of the invention is installed in an engine with an auxiliary combustion chamber. Namely, the gasket A is situated between the cylinder block J and the cylinder head H with the mouth plate L for forming the auxiliary combustion chamber M. The lower surface of the mouth plate L is shown to dent slightly toward the auxiliary combustion chamber M. The gasket A seals partly around the mouth plate L and entirely around the cylinder bore Hc on the cylinder block J.

The gasket A is provided with a plurality of cylinder bores Hc, water holes Hw, oil holes Ho and so on as in the conventional gasket 10. The gasket A comprises an upper plate 20, a lower plate 24 and three middle plates 21, 22, 23. The upper plate 20 is curved at a curved portion 25 adjacent the cylinder bore Hc and is arranged so that a flange 26 is located outside the lower plate 24. A seal ring 27 is situated adjacent to the curved portion 25. The curved portion 25 and the seal ring 27 substantially seal around the cylinder bore Hc.

Figure 5:
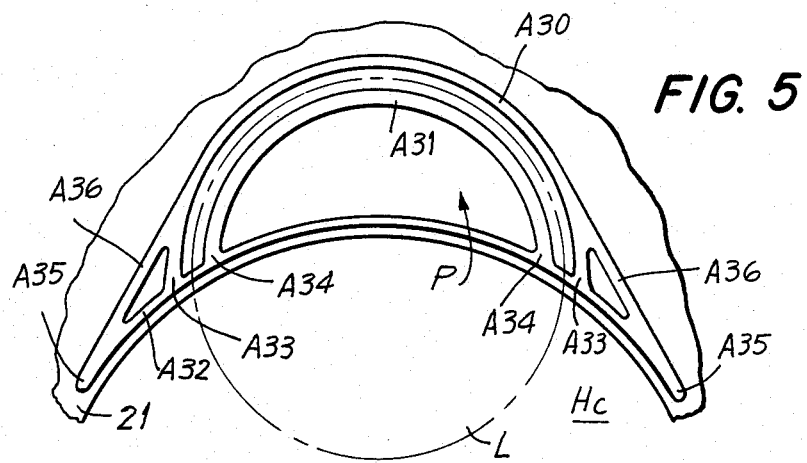
FIG. 5 is an explanatory plan view of a steel plate with beads of the first embodiment of the gasket of the invention.

As shown in FIG. 5, the middle plate 21 is provided with a semicircular bead A30 located outside an area P on which a part of the mouth plate L is mounted, a semicircular bead A31 located inside the area P, and a bead A32 situated around a part of the cylinder bore Hc. The bead A30 terminates at end portions A33, while the bead A31 terminates at end portions A34. The bead A32 extends throughout the area P and terminates at end portions A35. The end portions A33, A34 of the beads A30 and A31 intersect the bead A32.

The middle plate 21 is further provided with two beads A36, each extending from the end portion A35 to a middle portion of the bead A30. As a result, the beads A36 are located outside the end portions A33 intersecting the bead A32 relative to the cylinder bore Hc.

In the gasket A, even if the mouth plate L is slightly moved when operating the engine, the movement of the mouth plate L is absorbed by the beads A30, A31 to seal between the mouth plate L and the cylinder head H. Further, even if the mouth plate L or the cylinder head H is slightly deformed by heat and pressure around a border line between the mouth plate L and the cylinder head H, the beads A30, A31 can securely seal therearound. In this structure, areas around the end portions A33 are liable to leak. However, the areas around the end portions A33 are properly sealed by the beads A36.

In the gasket A, the beads are formed on the middle plate 21, but the beads may be provided on other plates. Even if modified, the gasket A can properly seal around the cylinder bore.

Figure 6:
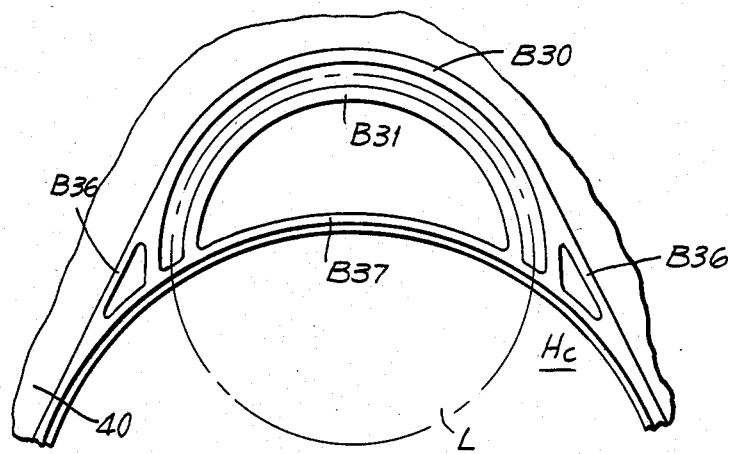
FIG. 6 is an explanatory plan view similar to FIG. 5, for showing a steel plate of a second embodiment of the invention.

FIG. 6 shows a second embodiment B of a steel laminate gasket of the present invention. The gasket B comprises the steel plates 20, 22, 23, 24 and the seal ring 27, as in the gasket A. The gasket B includes a steel plate 40 instead of the plate 21 in the gasket A.

The plate 40 includes beads B30, B31 and B36, similar to the beads A30, A31 and A36. The plate 40 is provided with, instead of the bead A32 in the gasket A, a bead B37 extending around the entire cylinder bore Hc. The bead B37 can properly seal around the cylinder bore Hc. Since the gasket B is provided with the bead B37 around the cylinder bore Hc, it is possible to seal around the cylinder bore Hc without the seal ring 27.

Figure 7:
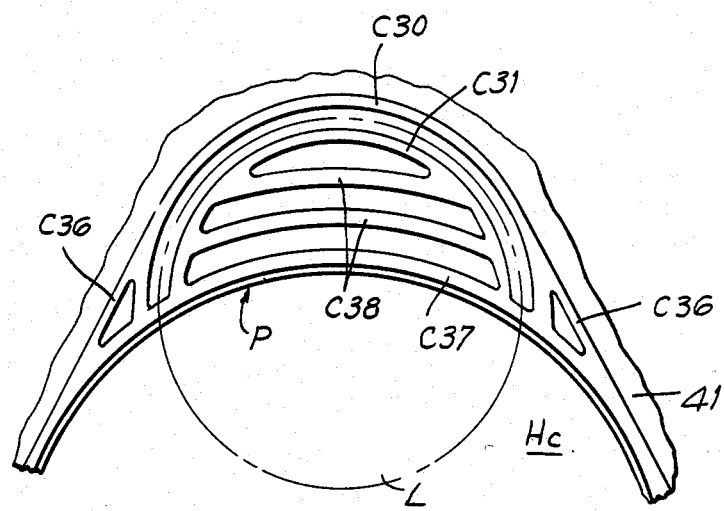
FIG. 7 is an explanatory plan view similar to FIG. 5, for showing a steel plate of a third embodiment of the invention.

FIG. 7 shows a third embodiment C of a steel laminate gasket of the present invention. The gasket C comprises the steel plates 20, 22, 23, 24 and the seal ring 27, as in the gasket A. The gasket C includes a steel plate 41 instead of the plate 21 in the gasket A.

The plate 41 includes beads C30, C31, C36 and C37 similar to the beads B30, B31, B36 and B37. Further, the plate 41 is provided with two beads C38 in the area P. The beads C38 extend concentrically with the bead C37 to support the mouth plate L. In the gasket C, the mouth plate L is securely retained in position. The gasket C can properly seal around the cylinder bore Hc. Since the gasket C is provided with the bead C37 around the cylinder bore Hc, it is possible to seal around the cylinder bore Hc without the seal ring 27, as in the gasket B.

Figure 8:
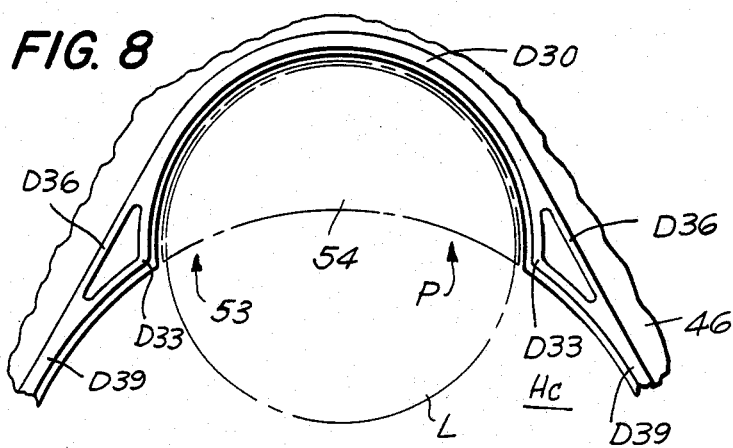
FIG. 8 is an explanatory plan view similar to FIG. 5, for showing a steel plate of a fourth embodiment of the invention.
Figure 10:
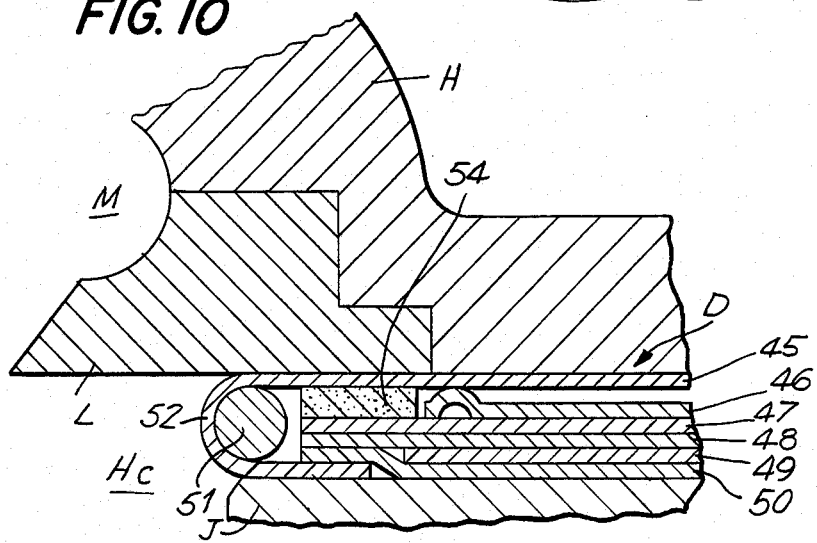
FIG. 10 is an explanatory section view of a gasket including the steel plate of the fourth embodiment of the invention installed in an engine with an auxiliary combustion chamber.

FIGS. 8 and 10 show a fourth embodiment D of a steel laminate gasket of the present invention. The gasket D comprises an upper plate 45, a lower plate 50 and four middle plates 46, 47, 48, 49. Also, a seal ring 51 is provided adjacent to a curved portion 52 of the upper plate 45.

As shown in FIG. 8, the middle plate 46 is provided with a notch 53 corresponding to the area P on which a part of the mouth plate L is mounted. The middle plate 46 further includes a semicircular bead D30 having end portions D33, a bead D39 extending between the end portions D33 around the cylinder bore Hc, and beads D36. The beads D36 are located outside the end portions D33 relative to the cylinder bore Hc.

In the notch 53, a sealing member 54 is placed. Namely, the sealing member 54 is held between the upper plate 45 and the middle plate 47 and seals around the area P. The sealing member 54 is a compressed sheet, which may be made of a graphite, metal fibers, glass fibers, carbon fibers, asbestos, mica or organic fibers (i.e. alumina fibers, silica fibers).

Figure 9:
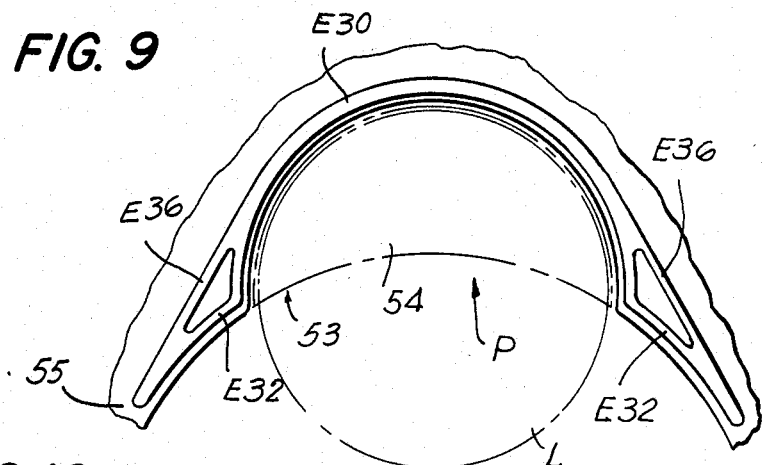
FIG. 9 is an explanatory plan view similar to FIG. 5, for showing a steel plate of a fifth embodiment of the invention.

FIG. 9 shows a fifth embodiment E of a steel laminate gasket of the present invention. The gasket E comprises the plates 45, 47, 48, 49, 50, and the seal ring 51, as in the gasket D. The gasket E includes a steel plate 55 instead of the plate 46.

The plate 55 is provided with the notch 53, and beads E30, E36 similar to the beads D30, D36. Further, two short beads E32 are formed on the plate 55 around the cylinder bore Hc. The sealing member 54 is situated in the notch 53. The gasket E operates as in the gasket D.

In the present invention, the bead situated outside the mouth plate can securely seal therearound, and the bead around the cylinder bore can also seal around the cylinder bore. Further, the areas where the two beads intersect are covered by additional beads. As a result, the gasket of the present invention can securely seal around the mouth plate.

While the invention has been explained with reference to the specific embodiments of the invention, the explanation is illustrative and the invention is limited only by the appended claims.

What is claimed is:

1. A steel laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, said gasket having at least one first sealing area around the cylinder bore and at least one second sealing area adjacent the first sealing area, on which the mouth plate is placed, said second sealing area being defined by a curved outer line corresponding to a part of a contour of the mouth plate and an inner line corresponding to a part of a contour of the cylinder bore, said gasket comprising:

a first plate including at least one curved first bead situated outside the second sealing area and adjacent to the curved outer line, said first bead having two outer ends located at the first sealing area adjacent the cylinder bore, at least one second bead, said second bead intercrossing the outer end of the first bead and extending at least partly along the cylinder bore in the first sealing area, and at least two third beads, each third bead extending between the first and second beads so that the outer end of the first bead is located close to the cylinder bore relative to the third bead, and at least one second plate situated adjacent to the first plate to form the steel laminate gasket.

2. A steel laminate type cylinder head gasket according to claim 1, wherein said first plate further includes a curved fourth bead situated in the second sealing area and adjacent to the curved outer line, said fourth bead having two outer ends located adjacent to the cylinder bore, and a curved fifth bead extending along and adjacent to the cylinder bore in the second sealing area, said fifth bead intercrossing the outer ends of the fourth bead and extending to the second beads to intercross thereto.

3. A steel laminate type cylinder head gasket according to claim 2, wherein said second bead comprises two beads located adjacent to the second sealing area.

4. A steel laminate type cylinder head gasket according to claim 3, wherein said first plate further includes at least one sixth bead located in the second sealing area and at a predetermined distance away from the fifth bead, said sixth bead having outer ends intercrossing the fourth bead.

5. A steel laminate type cylinder head gasket according to claim 1, wherein said first plate includes at least one notch at a portion corresponding to the second sealing area, said gasket further including a sealing material situated in the notch of the first plate so that the second sealing area is sealed by the sealing material.

6. A steel laminate type cylinder head gasket according to claim 5, wherein said sealing material is a compressed sheet made of a material selected from at least one of a graphite, metal fiber, glass fiber, carbon fiber, asbestos, mica and organic fiber.

7. A steel laminate type cylinder head gasket according to claim 6, wherein said second bead comprises two beads located adjacent to the second sealing area.

8. A steel laminate type cylinder head gasket according to claim 6, further comprising a third plate, said first plate being situated between the second and third plates.

* * * * *